United States Patent
Jiang et al.

(10) Patent No.: US 11,379,079 B2
(45) Date of Patent: Jul. 5, 2022

(54) TOUCH DRIVE METHOD, TOUCH DISPLAY DEVICE, AND ELECTRONIC EQUIPMENT

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yichen Jiang, Beijing (CN); Kwang Gyun Jang, Beijing (CN); Hongqiang Luo, Beijing (CN); Guiyu Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/270,070

(22) PCT Filed: May 14, 2020

(86) PCT No.: PCT/CN2020/090221
§ 371 (c)(1),
(2) Date: Feb. 22, 2021

(87) PCT Pub. No.: WO2021/226927
PCT Pub. Date: Nov. 18, 2021

(65) Prior Publication Data
US 2021/0365172 A1    Nov. 25, 2021

(51) Int. Cl.
G06F 3/041    (2006.01)
G06F 3/044    (2006.01)

(52) U.S. Cl.
CPC .......... *G06F 3/04184* (2019.05); *G06F 3/044* (2013.01); *G06F 3/0412* (2013.01); *G06F 3/04166* (2019.05)

(58) Field of Classification Search
CPC ............. G06F 3/04184; G06F 3/04166; G06F 3/0412; G06F 3/044
See application file for complete search history.

(56) References Cited

U.S. PATENT DOCUMENTS

| 10,001,855 B2 | 6/2018 | Chen |
| 2016/0202830 A1 | 7/2016 | Lee |

(Continued)

FOREIGN PATENT DOCUMENTS

| CN | 101833939 A | 9/2010 |
| CN | 105824449 A | 8/2016 |

(Continued)

*Primary Examiner* — Peter D McLoone
(74) *Attorney, Agent, or Firm* — Chiwin Law LLC (57) ABSTRACT

A touch drive method, a touch display device, and an electronic equipment are provided. The touch display device includes a display structure and a touch structure stacked with the display structure, a touch scan frequency of the touch structure is different from a display scan frequency of the display structure, and the touch drive method includes: applying a touch scan signal to the touch structure during a process in which the display structure performs progressive scan in respond to a row synchronization signal; a display noise signal is generated during at least one level switching process of the row synchronization signal; and each period of the touch scan signal has a signal rising edge and a signal falling edge, and the signal rising edge and the signal falling edge of each period of the touch scan signal are respectively located outside a noise duration of the display noise signal.

18 Claims, 5 Drawing Sheets

(56) References Cited

U.S. PATENT DOCUMENTS

2019/0064962 A1* 2/2019 Bye .................. G06F 3/041662
2020/0104003 A1 4/2020 Matsui
2020/0387283 A1* 12/2020 Jiang .................. G06F 3/04184

FOREIGN PATENT DOCUMENTS

| CN | 109324717 A | 2/2019 |
| CN | 110462571 A | 11/2019 |
| CN | 110955351 A | 4/2020 |
| KR | 20140104735 A | 8/2014 |

* cited by examiner

TOUCH DRIVE METHOD, TOUCH DISPLAY DEVICE, AND ELECTRONIC EQUIPMENT

This application is a U.S. National Phase Entry of International Application No. PCT/CN2020/090221 filed on May 14, 2020, designating the United States of America. The present application claims priority to and the benefit of the above-identified applications and the above-identified applications are incorporated by reference herein in their entirety.

TECHNICAL FIELD

The embodiments of the present disclosure relate to a touch drive method, a touch display device, and an electronic equipment.

BACKGROUND

With the development of display technology, various types of display devices have been used more and more widely. These display devices can provide users with colorful images and a good visual experience. Display devices mainly include liquid crystal display (LCD) devices and organic light-emitting diode (OLED) display devices, and for example, can be applied to a variety of electronic devices with a display function, such as mobile phones, televisions, notebook computers, and the like, moreover, based on the different needs of users for the display device, the display device can also take into account a plurality of functions, such as touch control at the same time.

SUMMARY

At least one embodiment of the present disclosure provides a touch drive method for a touch display device, the touch display device comprises a display structure and a touch structure stacked with the display structure, a touch scan frequency of the touch structure is different from a display scan frequency of the display structure, and the touch drive method comprises: applying a touch scan signal to the touch structure during a process in which the display structure performs progressive scan in respond to a row synchronization signal; a display noise signal is generated during at least one level switching process of the row synchronization signal; and each period of the touch scan signal has a signal rising edge and a signal falling edge, and the signal rising edge and the signal falling edge of each period of the touch scan signal are respectively located outside a noise duration of the display noise signal.

For example, the touch drive method provided by at least one embodiment of the present disclosure further comprises: generating a display mask signal based on the display noise signal; the display mask signal comprises a first level and a second level, in a time domain, the noise duration of the display noise signal overlaps with a duration of the first level of the display mask signal, and a non-noise duration of the display noise signal overlaps with a duration of the second level of the display mask signal.

For example, in the touch drive method provided by at least one embodiment of the present disclosure, the noise duration of the display noise signal falls within the duration of the first level of the display mask signal.

For example, in the touch drive method provided by at least one embodiment of the present disclosure, the signal rising edge of the touch scan signal is a stage at which the touch scan signal changes from a non-effective level to an effective level, and the signal falling edge of the touch scan signal is a stage at which the touch scan signal changes from the effective level to the non-effective level; or the signal rising edge of the touch scan signal is a stage at which the touch scan signal changes from the effective level to the non-effective level, and the signal falling edge of the touch scan signal is a stage at which the touch scan signal changes from the non-effective level to the effective level.

For example, the touch drive method provided by at least one embodiment of the present disclosure further comprises: generating the touch scan signal; the touch scan signal is maintained at the effective level in the duration of the first level of the display mask signal.

For example, the touch drive method provided by at least one embodiment of the present disclosure further comprises: generating an initial scan signal; in the time domain, in a case where a signal falling edge of the initial scan signal falls within the duration of the first level of the display mask signal, adjusting the signal falling edge of the initial scan signal to overlap with the signal falling edge of the display mask signal to generate the touch scan signal, so that the touch scan signal is maintained at the effective level in the duration of the first level of the display mask signal; and in the time domain, in a case where a signal rising edge of the initial scan signal falls within the duration of the first level of the display mask signal, adjusting the signal rising edge of the initial scan signal to overlap with the signal rising edge of the display mask signal to generate the touch scan signal, so that the touch scan signal is maintained at the effective level in the duration of the first level of the display mask signal.

For example, the touch drive method provided by at least one embodiment of the present disclosure further comprises: in the time domain, in a case where the signal rising edge or the signal falling edge of the initial scan signal does not fall within the duration of the first level of the display mask signal, enabling the touch scan signal to be identical to the initial scan signal.

For example, in the touch drive method provided by at least one embodiment of the present disclosure, in each period of the touch scan signal, the signal rising edge of the touch scan signal is before the signal falling edge of the touch scan signal, or in each period of the touch scan signal, the signal falling edge of the touch scan signal is before the signal rising edge of the touch scan signal.

For example, in the touch drive method provided by at least one embodiment of the present disclosure, the display structure comprises pixel units in N rows and M columns, and the display structure performs progressive scan on the pixel units in the N rows and M columns in response to N row synchronization signals; an n-th row synchronization signal controls a scan for an n-th row of the pixel units; and N and M are integers greater than 1, and n is an integer greater than or equal to 1 and less than or equal to N.

For example, in the touch drive method provided by at least one embodiment of the present disclosure, the touch structure switches working states in respond to signal rising edges and the signal falling edges of the touch scan signal.

At least one embodiment of the present disclosure also provides a touch display device, which comprises: a display structure, a touch structure, and a control unit; the display structure and the touch structure are stacked, and a touch scan frequency of the touch structure is different from a display scan frequency of the display structure, the control unit is configured to provide a row synchronization signal to the display structure, and apply a touch scan signal to the touch structure during a process in which the display structure performs progressive scan in respond to the row synchronization signal, and a display noise signal is generated during at least one level switching process of the row synchronization signal; and each period of the touch scan signal has a signal rising edge and a signal falling edge, and the signal rising edge and the signal falling edge of each period of the touch scan signal are respectively located outside a noise duration of the display noise signal.

For example, in the touch display device provided by at least one embodiment of the present disclosure, the control unit is further configured to: generate a display mask signal based on the display noise signal, the display mask signal comprises a first level and a second level, in a time domain, the noise duration of the display noise signal overlaps with a duration of the first level of the display mask signal, and a non-noise duration of the display noise signal overlaps with a duration of the second level of the display mask signal.

For example, in the touch display device provided by at least one embodiment of the present disclosure, the noise duration of the display noise signal falls within the duration of the first level of the display mask signal.

For example, in the touch display device provided by at least one embodiment of the present disclosure, the control unit is further configured to generate the touch scan signal, and the touch scan signal is maintained at an effective level in the duration of the first level of the display mask signal.

For example, in the touch display device provided by at least one embodiment of the present disclosure, the control unit is further configured to: generate an initial scan signal; in the time domain, in a case where a signal falling edge of the initial scan signal falls within the duration of the first level of the display mask signal, adjust the signal falling edge of the initial scan signal to overlap with the signal falling edge of the display mask signal to generate the touch scan signal, so that the touch scan signal is maintained at an effective level in the duration of the first level of the display mask signal; and in the time domain, in a case where a signal rising edge of the initial scan signal falls within the duration of the first level of the display mask signal, adjust the signal rising edge of the initial scan signal to overlap with the signal rising edge of the display mask signal to generate the touch scan signal, so that the touch scan signal is maintained at an effective level in the duration of the first level of the display mask signal.

For example, in the touch display device provided by at least one embodiment of the present disclosure, the control unit is further configured to: in the time domain, in a case where the signal rising edge or the signal falling edge of the initial scan signal does not fall within the duration of the first level of the display mask signal, enable the touch scan signal to be identical to the initial scan signal.

For example, in the touch display device provided by at least one embodiment of the present disclosure, the display structure comprises pixel units in N rows and M columns, and the control unit is further configured to provide N row synchronization signals to the display structure, so that the display structure performs progressive scan on the pixel units in the N rows and M columns in response to the N row synchronization signals; an n-th row synchronization signal controls a scan for an n-th row of the pixel units; and N and M are integers greater than 1, and n is an integer greater than or equal to 1 and less than or equal to N.

For example, in the touch display device provided by at least one embodiment of the present disclosure, the touch structure comprises a self-capacitive touch structure or a mutual-capacitive touch structure.

For example, in the touch display device provided by at least one embodiment of the present disclosure, the touch structure and the display structure form an in-cell structure or an on-cell structure.

At least one embodiment of the present disclosure also provides an electronic equipment, comprising the touch display device provided by any one embodiments of the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, in a display device with both a display function and a touch function, for example, in an OLED touch screen, a touch layer is usually arranged above a display layer. For example, the display layer includes pixel units in N rows and M columns (N and M are integers greater than 1) arranged in an array, and performs progressive scan on the pixel units in the N rows and M columns in response to a plurality of row synchronization signals to perform a display operation; the touch layer performs touch detection on the display device based on a received touch scan signal. However, in the display device, because the touch layer is relatively close to the display layer, and because a display noise signal is generated during the level switching stages of respective row synchronization signals, during a process in which the display device performs the display operation, the touch scan signal applied to the touch layer is usually interfered by the display noise signal, thereby affecting the accuracy of the touch detection of the display device.

Figure 1:
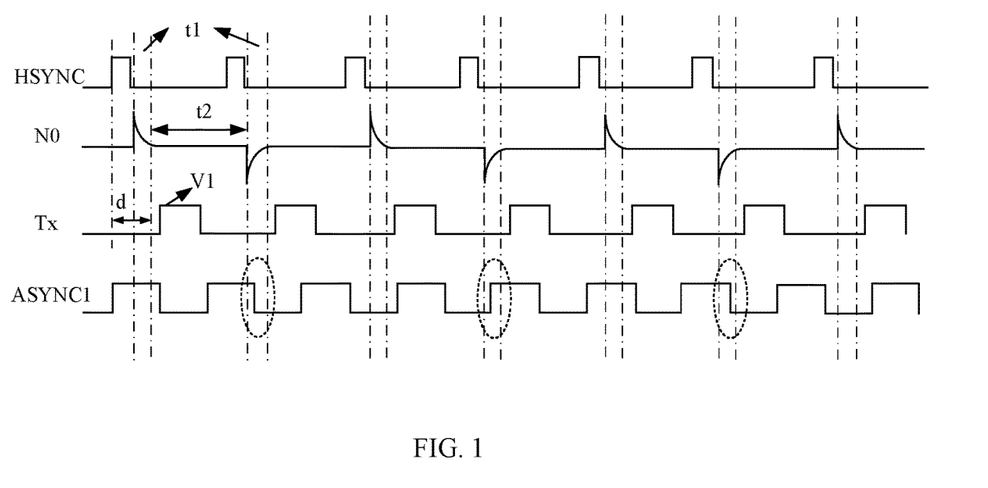
FIG. 1 is a schematic diagram of a touch drive method.

The inventor noticed that, for example, as illustrated in FIG. 1, in order to avoid the influence of the display noise signal N0 on the touch operation, a synchronous touch drive scan method can be used to control the display operation and the touch operation of the display device, that is, in the case where the display layer of the display device performs progressive scan based on the row synchronization signal HSYNC that is received, the display device applies the synchronization touch signal Tx to the touch layer in response to the row synchronization signal HSYNC to perform the display operation and the touch operation synchronously. In other words, a display scan frequency of the display layer is consistent with a touch scan frequency of the touch layer. For example, as illustrated in FIG. 1, in the case where a synchronous touch signal Tx is applied to the touch layer of the display device, an effective level V1 in the synchronous touch signal Tx is delayed by a time period d (for example, the time period d includes a noise duration t1 of the display noise signal N0), to avoid the noise duration t1 of the display noise signal, the synchronous touch signal Tx is applied to the touch layer in a non-noise duration t2 of the display noise signal to achieve the touch operation, so that the influence of the display noise signal N0 on the synchronous touch signal Tx can be avoided. However, because in the synchronous touch drive scan method, the touch scan frequency of the touch layer is limited by the display scan frequency of the display layer, and therefore, the display device cannot perform the touch operation at the optimal touch scan frequency, which affects the accuracy of the touch detection of the display device.

The inventor also noticed that in order to overcome the problem that the frequency of the touch scan signal is limited in the synchronous touch drive scan method, an asynchronous touch drive scan method can be used to control the display operation and the touch operation of the display device, that is, the touch operation is no longer scanned synchronously with the display operation, and the touch operation and the display operation are controlled separately. For example, as illustrated in FIG. 1, in the asynchronous touch drive scan method, an asynchronous touch signal ASYNC1 is not synchronized with the row synchronization signal HSYNC, and can be applied to the touch layer at any time according to requirements, so that the touch operation can be performed with the optimal touch scan frequency. However, because in the asynchronous touch drive scan method, the frequency of the asynchronous touch signal ASYNC1 is no longer limited, therefore, as illustrated in the elliptical dashed line in FIG. 1, levels of the touch scan signal may be switched in the noise duration t1 of the display noise signal, thereby causing strong noise interference to the touch scan signal, which greatly affects the touch performance of the display device. Therefore, how to implement a novel asynchronous touch drive scan method has become an urgent problem to be solved currently.

At least one embodiment of the present disclosure provides a touch drive method for a touch display device, the touch display device comprises a display structure and a touch structure stacked with the display structure, a touch scan frequency of the touch structure is different from a display scan frequency of the display structure, and the touch drive method comprises: applying a touch scan signal to the touch structure during a process in which the display structure performs progressive scan in respond to a row synchronization signal. A display noise signal is generated during at least one level switching process of the row synchronization signal; and each period of the touch scan signal has a signal rising edge and a signal falling edge, and the signal rising edge and the signal falling edge of each period of the touch scan signal are respectively located outside a noise duration of the display noise signal.

Some embodiments of the present disclosure also provide a touch display device and an electronic equipment corresponding to the above touch drive method.

In the touch drive method provided by the above-mentioned embodiments of the present disclosure, on one hand, the touch scan frequency can be no longer limited by the display scan frequency, therefore touch display device can operate at the optimal touch scan frequency, and the technical support is provided for achieving the design of a touch chip with a high reporting rate or high scan frequency; on the other hand, compared to the asynchronous touch drive scan method, the touch drive method of the embodiments of the present disclosure can avoid that the touch scan signal switches between a high level and a low level in the noise duration of the display noise signal, thereby avoiding the influence of the display noise signal on the touch scan signal, and greatly improving the touch signal-to-noise ratio of the touch display device.

The embodiments and the examples of the present disclosure will be described in detail below with reference to the accompanying drawings.

Figure 2:
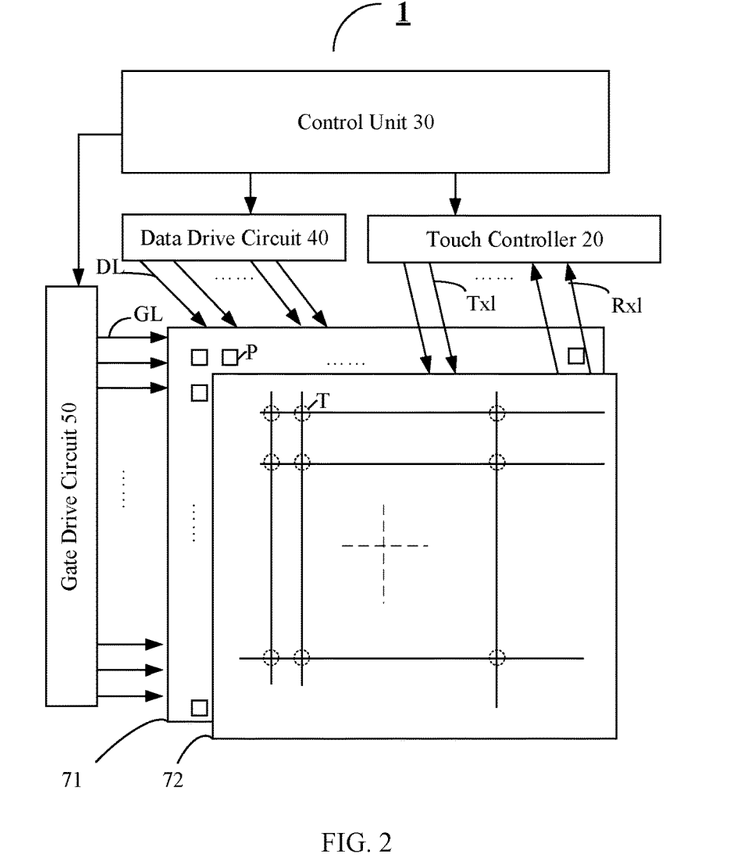
FIG. 2 is a schematic diagram of a touch display device provided by at least one embodiment of the present disclosure.

At least one embodiment of the present disclosure provides a touch drive method, for example, the touch drive method can be used in a touch display device. FIG. 2 is a schematic diagram of a touch display device provided by at least one embodiment of the present disclosure. As illustrated in FIG. 2, in some examples, the touch display device 1 includes a display structure 71 and a touch structure 72 (for example, also called a touch layer) stacked with the display structure 71 (for example, also called a display layer). For example, the display structure 71 and the touch structure 72 are stacked on a base substrate (not illustrated), and the touch structure 72 is located closer to a user than the display structure 71; further, an effective touch region of the touch structure 72 and an effective display region of the display structure 71 correspond to each other, and their orthographic projections on the base substrate are consistent. For example, in other examples, the touch display device 1 further includes a control unit 30; and the display structure 71 includes a data drive circuit 40 and a gate drive circuit 50.

For example, the display structure 71 further includes pixel units P in N rows and M columns, and the display structure 71 performs progressive scan on the pixel units P in the N rows and M columns in response to N row synchronization signals. For example, an n-th (n is an integer greater than or equal to 1 and less than or equal to N) row synchronization signal controls the scan for an n-th row of the pixel units P.

For example, the pixel units P in the N rows and M columns form a pixel array, and the pixel array can implement progressive scan on display sub-pixels in the pixel array by sequentially applying a corresponding gate scan signal (provided by the gate drive circuit 50) to respective rows; alternatively, the pixel array can also sequentially scan the display sub-pixels in the pixel array by applying a gate scan signal to every interlacing row, for example, the display sub-pixels in odd-numbered rows or even-numbered rows of the pixel array are scanned row by row, and the embodiments of the present disclosure are not limited to this case.

For example, the control unit 30 provides control signals to the gate drive circuit 50 and the data drive circuit 40 of the display structure 71 and a touch controller 20 in response to externally provided image signals, respectively, to control them to operate in synchronization with each other. For example, the control unit 30 is configured to provide N row synchronization signals to the display structure 71, for example, the gate scan signal provided by the gate drive circuit 50 is provided to pixel units P in a corresponding row under the control of the row synchronization signal provided by the control unit 30 to achieve the progressive scan of the pixel array in the display structure 71. For example, the n-th row of gate scan signal is applied to the pixel units P in the n-th row under the control of the n-th row synchronization signal, so that the data drive circuit 40 can write display data to be displayed to the pixel units P in the n-th row, and therefore, the pixel units P in the N rows and M columns of the display structure 71 achieve progressive scan under the control of the row synchronization signals. For example, the control unit 30 may be a central processing unit (CPU), a digital signal processor (DSP), an image processor (GPU), or other forms of processing units with data processing capabilities and/or instruction execution capabilities, may be a general-purpose processor or a special-purpose processor, and can control other components in the touch display device 1 to perform desired functions. For example, the processor may be a general-purpose processor or a special-purpose processor, and may also be a processor based on the X86 or ARM architecture.

For example, the data drive circuit 40 is used to provide data signals to the pixel units P in the N rows and M columns; the gate drive circuit 50 is used to provide the above-mentioned gate scan signals to the pixel units P in the N rows and M columns to achieve progressive scan. The data drive circuit 40 is electrically connected to the pixel units P in the N rows and M columns through data lines DL, and the gate drive circuit 50 is electrically connected to the pixel units P in the N rows and M columns through gate lines GL.

For example, the gate drive circuit 50 may adopt a cascade connection mode of a plurality of shift register units to output a group of shift signals as gate scan signals. For example, the gate drive circuit 50 may be arranged on (for example, directly prepared on) an array substrate of the touch display device to form an array substrate gate drive circuit (Gate Driver On Array, GOA), or may also be arranged outside the array substrate, for example, is electrically connected to scan lines on the array substrate through a flexible circuit board or the like, so as to perform progressive scan on the display sub-pixels in the pixel array. For example, in the case where the gate drive circuit 50 is used to drive the pixel array, the gate drive circuit may be arranged on one side of the touch display device 1. Of course, the gate drive circuit 50 can also be provided on both sides of the touch display device 1 to achieve bilateral driving. For example, a gate drive circuit may be provided on one side of the touch display device 1 to achieve the scan of odd-numbered rows of the display sub-pixels, and a gate drive circuit may be provided on the other side of the touch display device to achieve the scan of even-numbered rows of the display sub-pixels.

It should be noted that the structures and the working principles of the above-mentioned data drive circuit 40 and the gate drive circuit 50 can refer to designs in this field, and the description will not be repeated here.

For example, the touch structure 72 includes a self-capacitive touch structure or a mutual-capacitive touch structure, the embodiments of the present disclosure are not limited in the aspect.

For example, the touch structure 72 includes the touch controller 20. The touch control 20 receives a touch scan signal, and applies touch drive signals to an array of touch units T in the touch structure 72 in response to the received touch scan signal. For example, the touch controller 20 provides touch drive signals to the array of touch units T in the touch structure 72 through a plurality of touch scan lines (for example, including drive lines Tx and/or detection lines Rx), thereby enabling the touch structure 72 to perform a corresponding touch operation. For example, the touch controller 20 applies the touch drive signals to the touch structure 72 under the control of, for example, the touch scan signal provided by the control unit 30. For example, the touch controller 20 may be implemented as a semiconductor chip.

For example, in the example illustrated in FIG. 2, taking the case that the touch structure 72 is a mutual-capacitance touch structure as an example for description, for example, the touch structure 72 includes an array of touch units T, the array includes P*Q (P and Q are integers greater than 0, for example, refer to the number of rows and the number of columns, respectively) touch units T, each touch unit T includes a drive electrode and a detection electrode (as illustrated in the figure, the drive electrode extends horizontally and the detection electrode extends longitudinally), the drive electrode and the detection electrode cross each other and are insulated, and a detection capacitor is formed where the drive electrode and the detection overlap. For example, drive electrodes of the same row in the P*Q touch units T are connected in series with each other and are connected to the touch controller 20 through the same drive line Tx1 to receive the touch drive signal, and detection electrodes of the same column in the P*Q touch units T are connected in series with each other and are connected to the touch controller 20 through the same detection line Rx1 to transmit the detection signals generated by the touch display panel for touch analysis. For example, the touch drive signals are input to the drive electrodes row by row under the control of the touch scan signals, so as to achieve the touch scan of the touch structure 72. For example, in the case where a human finger touches the detection capacitor, the finger is a conductor and grounded, which will cause the capacitance value of the detection capacitor to change, so that the touch scan signal input by the drive electrode is coupled by the detection electrode to obtain the touch detection signal that will also change accordingly, then, by detecting the output touch detection signal, it can be determined whether there is a touch and where there is a touch.

For example, the touch structure 72 may be formed as an in-cell structure or an on-cell structure with respect to the display structure 71, and the embodiments of the present disclosure are not limited to this case.

For example, the touch scan frequency of the touch structure 72 is different from the display scan frequency of the display structure 71, that is, the touch display device 1 adopts an asynchronous touch drive scan method to achieve the control of the display operation of the display structure 71 and the control of the touch operation of the touch structure 72. For example, the touch display device 1 may include an LCD touch display device, an OLED touch display device, a quantum dot light-emitting diode (QLED) touch display device, or an electronic paper touch display device, etc., the embodiments of the present disclosure are not limited in this aspect.

Figure 3:
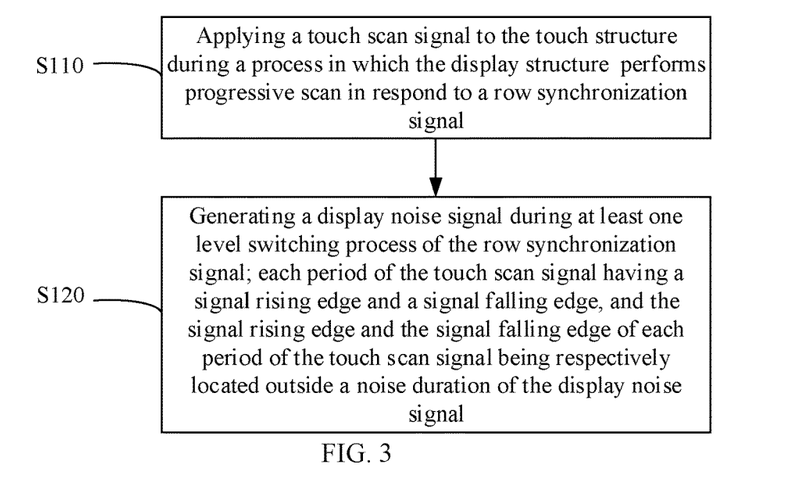
FIG. 3 is a flowchart of a touch drive method provided by at least one embodiment of the present disclosure.
Figure 4:
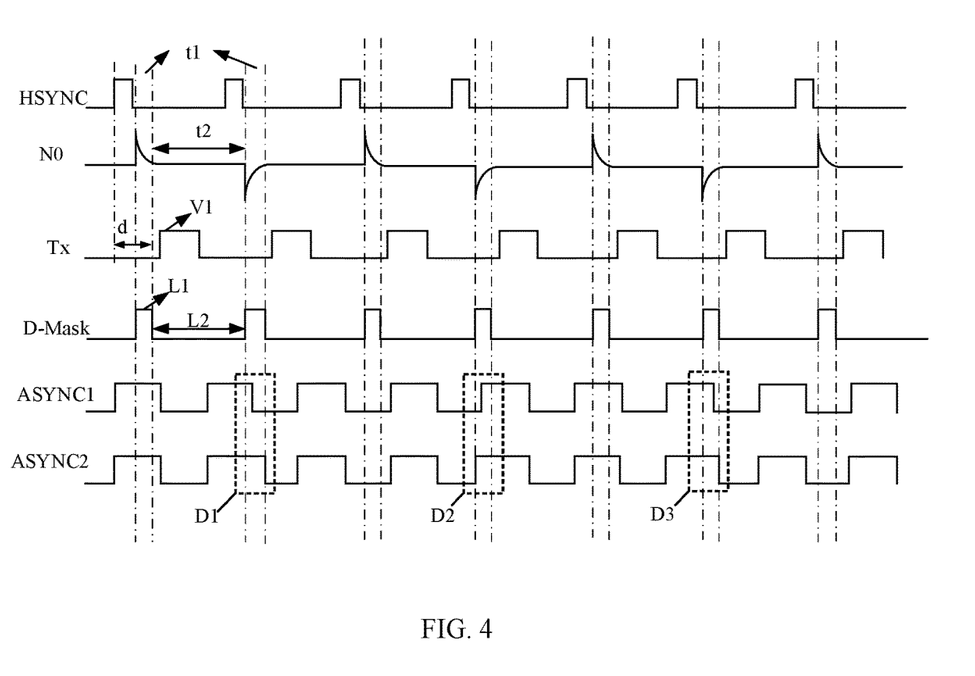
FIG. 4 is a signal timing diagram of a touch drive method provided by at least one embodiment of the present disclosure.

FIG. 3 is a flowchart of a touch drive method provided by at least one embodiment of the present disclosure; and FIG. 4 is a signal timing diagram of a touch drive method provided by at least one embodiment of the present disclosure. As illustrated in FIG. 3, the touch drive method includes steps S110 to S120. The touch drive method provided by at least one embodiment of the present disclosure will be described in detail below with reference to FIGS. 3 to 4.

Step S110: applying a touch scan signal to the touch structure during a process in which the display structure performs progressive scan in respond to a row synchronization signal.

Step S120: generating a display noise signal during at least one level switching process of the row synchronization signal; each period of the touch scan signal having a signal rising edge and a signal falling edge, and the signal rising edge and the signal falling edge of each period of the touch scan signal being respectively located outside a noise duration of the display noise signal.

For step S110, for example, as illustrated in FIG. 4, in the process in which the display structure 71 performs progressive scan in response to the row synchronization signal HSYNC, the touch scan signal ASYNC2 is applied to the touch controller 20 in the touch structure 72, for example, the touch scan signal ASYNC2 may be periodic or aperiodic, the embodiments of the present disclosure are not limited in this aspect. For example, as illustrated in FIG. 4, the frequency of the touch scan signal ASYNC2 is different from the frequency of the row synchronization signal HSYNC, that is, a method that the display operation and the touch operation are controlled separately is adopted, that is, the asynchronous touch drive scan method is adopted to achieve the control of the display operation of the display structure 71 and the control of the touch operation of the touch structure 72. In this way, it can avoid the problem that in the case where the synchronous touch drive scan method is adopted, the scan frequency of the synchronous touch signal Tx is limited to the frequency of the row synchronization signal HSYNC (that is, the scan frequency of the synchronous touch signal Tx is the same as the frequency of the row synchronization signal HSYNC), so that the touch display device can operate at the optimal touch scan frequency and the technical support is provided for achieving the design of a touch chip with a high reporting rate or high scan frequency.

For step S120, for example, in some embodiments of the present disclosure, each period of the touch scan signal ASYNC2 has a signal rising edge and a signal falling edge, for example, the signal rising edge and the signal falling edge of the touch scan signal ASYNC2 represent the level switching of the touch scan signal. For example, the signal rising edge of the touch scan signal ASYNC2 is a stage at which the touch scan signal ASYNC2 changes from a non-effective level to an effective level, and the signal falling edge of the touch scan signal ASYNC2 is a stage at which the touch scan signal ASYNC2 changes from the effective level to the non-effective level.

It should be noted that, in the embodiments of the present disclosure, the "effective level" of the touch scan signal represents a level that enables the touch unit T in the touch structure 72 illustrated in FIG. 2 to perform touch detection; and the "non-effective level" of the touch scan signal represents a level that enables the touch unit T in the touch structure 72 illustrated, for example, in FIG. 2 not to perform touch detection. For example, in the embodiments of the present disclosure, the case that the effective level is a high level and the non-effective level is a low level is taken as an example. Of course, the effective level can also be a low level, and the non-effective level can also be a high level, and the embodiments of the present disclosure are not limited to this case.

For example, in the case where the effective level is a low level and the non-effective level is a high level, the signal rising edge of the touch scan signal is the stage at which the touch scan signal changes from the effective level to the non-effective level, and the signal falling edge of the touch scan signal is a stage at which the touch scan signal changes from the non-effective level to the effective level, and the embodiments of the present disclosure are not limited to this case.

For example, as illustrated in FIG. 4, in each period of the touch scan signal ASYNC2, the signal rising edge of the touch scan signal ASYNC2 is before the signal falling edge of the touch scan signal ASYNC2; alternatively, in each period of the touch scan signal, the signal falling edge of the touch scan signal is before the signal rising edge of the touch scan signal.

For example, in some embodiments of the present disclosure, the display noise signal N0 is generated during at least one level switching process of the row synchronization signal HSYNC. For example, FIG. 4 only shows that the display noise signal N0 is generated at the signal falling edge (that is, within the noise duration t1) of the row synchronization signal HSYNC, of course, it is also possible to generate the display noise signal N0 at the signal rising edge of the row synchronization signal HSYNC, as long as it is the stage at which the high level and the low level of the row synchronization signal HSYNC are switched, the display noise signal can be generated, and the embodiments of the present disclosure are not limited to this case.

Because the switching between the high level and the low level the touch scan signal is performed in the noise duration t1, the generated display noise signal N0 will cause greater interference to the touch scan signal, thereby affecting the accuracy of the touch detection of the touch structure. Therefore, when applying the touch scan signal to the touch structure, it should be avoided that the touch scan signal has a level change in the noise duration t1 of the display noise signal N0.

For example, in some embodiments of the present disclosure, the signal rising edge and the signal falling edge of each period of the touch scan signal ASYNC2 are respectively located outside the noise duration t1 of the display noise signal, that is, as illustrated in FIG. 4, the noise duration t1 of the display noise signal N0 only corresponds to the effective level or the non-effective level of the touch scan signal, namely, the level switching stage of the touch scan signal ASYNC2 is not within the noise duration t1, so that the interference of the display noise signal N0 on the touch scan signal can be avoided, and the touch signal-to-noise ratio of the touch display device can be improved.

Figure 5:
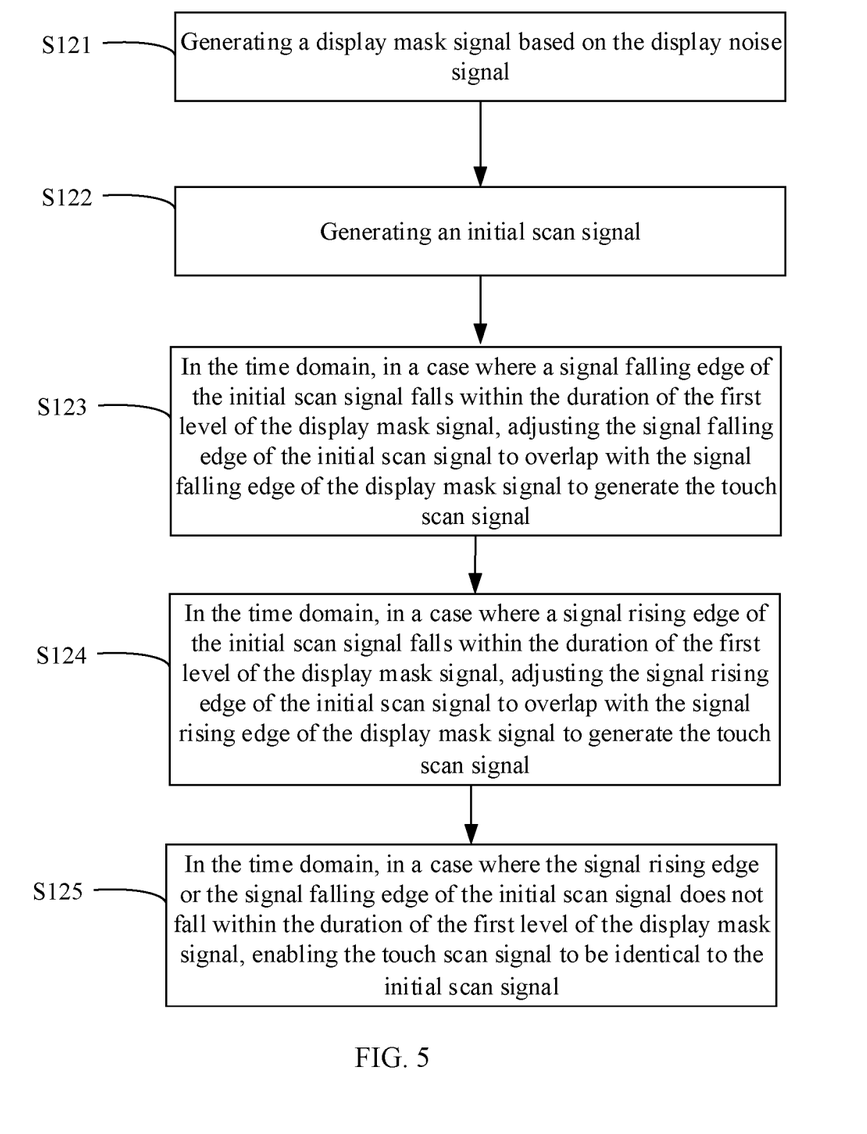
FIG. 5 is a flowchart of a method for determining a touch scan signal provided by at least one embodiment of the present disclosure.

FIG. 5 is a flowchart of a method for determining a touch scan signal provided by at least one embodiment of the present disclosure. As illustrated in FIG. 5, the method for determining the touch scan signal includes step S121-step S125.

Step S121: generating a display mask signal based on the display noise signal.

For example, as illustrated in FIG. 4, the display mask signal D-Mask is generated based on the display noise signal N0. For example, the display mask signal D-Mask is used to determine the touch scan signal ASYNC2. For example, the display mask signal D-Mask includes a first level L1 (for example, a high level) and a second level L2 (for example, a low level). In the time domain, the noise duration t1 of the display noise signal N0 corresponds to the first level L1 of the display mask signal D-Mask, a non-noise duration t2 of the display noise signal N0 corresponds to the second level L2 of the display mask signal D-Mask, thereby determining the display mask signal D-Mask.

For example, the noise duration t1 of the display noise signal N0 falls within the interval of the first level L1 of the display mask signal D-Mask, that is, the high level interval of the display mask signal D-Mask should be slightly wider than the noise duration t1 of the display noise signal N0, so that the noise part of the display noise signal N0 completely falls into the display mask signal D-Mask to ensure the noise mask effect.

For example, in some examples, the touch scan signal that remains at the effective level in a duration of the first level of the display mask signal can be directly generated, that is, the signal rising edge and the signal falling edge of each period of the touch scan signal are respectively located outside the noise duration of the display noise signal.

In other embodiments, the touch scan signal may be determined based on the following steps S122-S124. The details are described as follows.

Step S122: generating an initial scan signal.

For example, as illustrated in FIG. 4, the initial scan signal ASYNC1 is a touch scan signal used in an asynchronous touch drive scan method and can be determined according to the touch scan frequency, and the similar portions will not be repeated here.

Step S123: in the time domain, in a case where a signal falling edge of the initial scan signal falls within the duration of the first level of the display mask signal, adjusting the signal falling edge of the initial scan signal to overlap with the signal falling edge of the display mask signal to generate the touch scan signal.

For example, as illustrated in dashed boxes D1 and D3 shown in FIG. 4, in the case where the first level L1 of the display mask signal D-Mask corresponds to the signal falling edge of the initial scan signal ASYNC1, that is, in the case where the signal falling edge of the initial scan signal ASYNC1 falls within the duration of the first level L1 of the display mask signal D-Mask (for example, greater than or equal to the noise duration t1), namely, in the case where the initial scan signal ASYNC1 performs level switching in the noise duration t1, the display noise signal N0 will interfere with the initial scan signal ASYNC1, and therefore, the signal falling edge of the initial scan signal is adjusted to correspond to (i.e., overlap) the signal falling edge of the display mask signal D-Mask to generate the touch scan signal ASYNC2, so that the touch scan signal ASYNC2 is maintained at an effective level (for example, a high level) in the duration of the first level of the display mask signal D-Mask, that is, the newly generated touch scan signal ASYNC2 does not perform level switching in the noise duration t1, thereby avoiding the interference of the display noise signal N0 on the touch operation.

For example, as illustrated in FIG. 4, in the time domain, the interval of the effective level of the initial scan signal ASYNC1 is expanded so that the signal falling edge of the initial scan signal corresponds to the signal falling edge of the display mask signal D-Mask to generate the touch scan signal ASYNC2, that is, the time during which the effective level of the touch scan signal ASYNC2 is applied to the touch unit T of the touch structure is extended, so as to avoid the noise duration t1 of the display noise signal N0 from corresponding to the level switching period of the touch scan signal, thereby avoiding the problem of large noise interference when the initial scan signal ASYNC1 is switched between the high level and the low level in the noise duration t1 of the display noise signal N0, thereby greatly improving the touch signal-to-noise ratio of the touch display device.

Step S124: in the time domain, in a case where a signal rising edge of the initial scan signal falls within the duration of the first level of the display mask signal, adjusting the signal rising edge of the initial scan signal to overlap with the signal rising edge of the display mask signal to generate the touch scan signal.

For example, as illustrated in a dashed box D2 illustrated in FIG. 4, in the case where the first level L1 of the display mask signal D-Mask corresponds to the signal rising edge of the initial scan signal ASYNC1, that is, in the case where the signal rising edge of the initial scan signal falls within the duration of the first level of the display mask signal, namely, in the case where the initial scan signal ASYNC1 performs level switching in the noise duration t1, the display noise signal N0 will interfere with the initial scan signal ASYNC1. Therefore, the signal rising edge of the initial scan signal is adjusted to correspond to (i.e., overlap) the signal rising edge of the display mask signal D-Mask to generate the touch scan signal ASYNC2, so that the touch scan signal ASYNC2 is maintained at an effective level (for example, a high level) in the duration of the first level of the display mask signal D-Mask, that is, the newly generated touch scan signal ASYNC2 does not perform level switching in the noise duration t1, thereby avoiding the interference of the display noise signal N0 on the touch operation.

For example, as illustrated in FIG. 4, in the time domain, the interval of the effective level of the initial scan signal ASYNC1 is expanded so that the signal rising edge of the initial scan signal corresponds to the signal rising edge of the display mask signal D-Mask, so as to generate the touch scan signal ASYNC2, that is, the touch scan signal ASYNC2 is applied to the touch unit T of the touch structure in advance of the phase difference between the two signals, so as to avoid the noise duration t1 of the display noise signal N0 from corresponding to the level switching period of the touch scan signal, thereby avoiding the problem of large noise interference in the case where the initial scan signal ASYNC1 is switched between the high level and the low level in the noise duration t1 of the display noise signal N0, and greatly improving the touch signal-to-noise ratio of the touch display device.

Step S125: in the time domain, in a case where the signal rising edge or the signal falling edge of the initial scan signal does not fall within the duration of the first level of the display mask signal, enabling the touch scan signal to be identical to the initial scan signal.

For example, as illustrated in FIG. 4, in the case where the first level L1 of the display mask signal D-Mask does not correspond to the signal rising edge or the signal falling edge of the initial scan signal ASYNC1, that is, in the case where the signal rising edge or the signal falling edge of the initial scan signal does not fall within the duration of the first level of the display mask signal, for example, in the case where the first level L1 of the display mask signal D-Mask corresponds to the effective signal (for example, the high level) or the non-effective level (for example, the low level) of the initial scan signal ASYNC1, in this case, the display noise signal will not cause noise interference on the touch scan signal, therefore, the touch scan signal ASYNC2 remains the same as the initial scan signal ASYNC1. That is, in this case, the original touch scan method can be used to perform a touch operation on the touch structure.

For example, in some embodiments of the present disclosure, the touch structure may respond to the signal rising edge and the signal falling edge of the touch scan signal ASYNC2 to switch the working states, and then perform, for example, a touch scan operation. For example, the touch scan signal ASYNC2 can be any signal in the touch detection process of the touch structure, can be a touch drive signal applied to the drive electrode of the touch structure, can also be the touch sensing signal from the detection electrode of the touch structure, or can also be an enable signal for controlling the working state of the touch structure, etc., and the embodiments of the present disclosure are not limited to this case.

For example, in the display process of the display panel, the touch structure can enter the touch scan stage (that is, the working state is switched to the touch scan state) of the display panel in response to the signal rising edge and the signal falling edge of the touch scan signal ASYNC2, thereby performing the touch function.

For example, in some embodiments of the present disclosure, the touch structure may include a self-capacitive touch structure or a mutual-capacitive touch structure. For example, in the case where the touch structure adopts a self-capacitive touch structure, the touch structure can respond to the signal rising edge and the signal falling edge of the touch scan signal ASYNC2 to detect the capacitance change at the touch position. For example, in the case where the touch structure adopts a mutual-capacitance touch structure, the touch structure may respond to the signal rising edge and the signal falling edge of the touch scan signal ASYNC2 to perform scan and sensing operations.

For example, in some embodiments of the present disclosure, the touch structure and the display structure may form an in-cell structure or an on-cell structure.

For example, in the case where the touch structure and the display structure form an on-cell structure, the display structure may be a normal display panel, such as a liquid crystal display panel, an OLED display panel, or a QLED display panel, etc., and the touch structure may be a touch layer or a touch panel. In this case, the display structure may include, for example, an array substrate and an opposite substrate disposed opposite to the array substrate, and the array substrate and the opposite substrate are combined with each other to form a space for accommodating liquid crystal materials or OLED devices, for example. The touch structure is, for example, directly formed on the opposite substrate or attached to the opposite substrate.

For another example, in the case where the touch structure and the display structure form an in-cell structure, the display structure may be an array substrate, the array substrate is provided with electroluminescent materials or liquid crystal layers, etc., and the touch structure may be a touch layer. In this case, the touch structure is disposed on the array substrate, or the touch structure is disposed on a side of the opposite substrate, which is opposite to the array substrate, facing the array substrate. The array substrate may also include a plurality of functional film layers, which may be determined according to actual requirements. The embodiments of the present disclosure are not limited to the structural forms of the touch structure and the display structure.

It should be noted that the touch drive method provided by some embodiments of the present disclosure can be applied to an OLED display device, an QLED display device, an electronic paper display device, or a liquid crystal display device, which have a touch function, or may also be applied to any other type of display devices with a touch function, and the embodiments of the present disclosure are not limited to this case.

For example, the touch drive method provided by the embodiments of the present disclosure can be applied to a touch display device with a thinner thickness and a narrow frame, such as a flexible multi-layer on-cell (FMLOC) display device with a touch function, so that the touch signal-to-noise ratio of this type of touch display device can be improved, and the accuracy of the touch detection of the touch display device is improved.

At least one embodiment of the present disclosure also provides a touch display device. As illustrated in FIG. 2, the touch display device 1 includes: a display structure 71, a touch structure 72, and a control unit 30. For example, as illustrated in FIG. 2, the touch structure 72 includes a touch controller 20, and the display structure 71 includes a gate drive circuit 50 and a data drive circuit 40. For example, as illustrated in FIG. 2, the display structure 71 and the touch structure 72 are stacked, and a touch scan frequency of the touch structure 72 and a display scan frequency of the display structure 71 are different. For specific introduction, reference may be made to the introduction of FIG. 2 above, and the specific introduction will not be repeated here.

For example, the control unit 30 is configured to generate a row synchronization signal HSYNC and a touch scan signal ASYNC2. For example, the control unit 30 provides the row synchronization signal HSYNC to the display structure 71 and provides the touch scan signal ASYNC2 to the touch structure 72.

For example, in some examples, the control unit 30 is configured to apply the touch scan signal ASYNC2 to the touch structure 72 during a process in which the display structure 71 responds to a row synchronization signal HSYNC provided by the control unit 30 to perform progressive scan. For example, the control unit 30 applies a periodic touch scan signal ASYNC2 to the touch controller 20 of the touch structure 72, and the touch controller 20 responds to the touch scan signal ASYNC2 to provide touch drive signals to an array of touch units T in the touch structure. For specific introduction, reference may be made to the description of FIG. 2 above, and the specific introduction will not be repeated here.

For example, the display noise signal N0 is generated during at least one level switching process of the row synchronization signal HSYNC; each period of the touch scan signal ASYNC2 has a signal rising edge and a signal falling edge, and the signal rising edge and the signal falling edge of each period of the touch scan signal ASYNC2 are respectively located outside a noise duration t1 of the display noise signal N0. For example, the control unit 30 may implement step S110 and step S120 of the aforementioned touch drive method, for specific introduction, reference may be made to the related description of step S110 and step S120, and the specific introduction will not be repeated here.

For example, in some examples, the control unit 30 is further configured to generate the display mask signal D-Mask based on the display noise signal N0. For example, the display mask signal D-Mask includes a first level L1 and a second level L2. In the time domain, the noise duration t1 of the display noise signal N0 corresponds to the duration of the first level L1 of the display mask signal D-Mask, the non-noise duration t2 of the display noise signal N0 corresponds to the duration of the second level L2 of the display mask signal D-Mask. For example, the noise duration t1 of the display noise signal N0 falls within the duration of the first level L1 of the display mask signal D-Mask. For example, in this example, the control unit 30 can implement step S121 of the above-mentioned touch drive method. For specific introduction, reference may be made to the relevant description of the above-mentioned step S121, and the specific introduction will not be repeated here.

For example, "correspond" in at least one embodiment of the present disclosure means that two signals overlap in the time domain. For example, the noise duration t1 of the display noise signal N0 overlaps with the duration of the first level L1 of the display mask signal D-Mask or the non-noise duration t2 of the display noise signal N0 overlaps with the duration of the second level L2 of the display mask signal D-Mask.

For example, in some examples, the control unit 30 is further configured to generate a touch scan signal, for example, the touch scan signal is maintained at an effective level in the duration of the first level of the display mask signal. That is, the control unit 30 directly generates the touch scan signal that is maintained at the effective level in the duration of the first level of the display mask signal D-Mask. Namely, the signal rising edge and the signal falling edge of each period of the touch scan signal are respectively located outside the noise duration t1 of the display noise signal N0.

For example, in other examples, the control unit 30 is also configured to: generate an initial scan signal ASYNC1; in the time domain, in the case where a signal falling edge of the initial scan signal ASYNC1 falls within the duration of the first level L1 of the display mask signal D-Mask, the signal falling edge of the initial scan signal ASYNC1 is adjusted to overlap with the signal falling edge of the display mask signal D-Mask to generate the touch scan signal ASYNC2, so that the touch scan signal ASYNC2 is maintained at the effective level in the duration of the first level L1 of the display mask signal D-Mask. For example, in this example, the control unit 30 can implement steps S122-123 of the above-mentioned touch drive method, for specific introduction, reference may be made to the relevant description of the above-mentioned steps S122-123, and the specific introduction will not be repeated here.

For example, in some examples, the control unit 30 is further configured to: in the time domain, in the case where a signal rising edge of the initial scan signal ASYNC1 falls within the duration of the first level L1 of the display mask signal D-Mask, the signal rising edge of the initial scan signal ASYNC1 is adjusted to overlap with the signal rising edge of the display mask signal D-Mask to generate the touch scan signal ASYNC2, so that the touch scan signal ASYNC2 is maintained at the effective level in the duration of the first level L1 of the display mask signal D-Mask. For example, in this example, the control unit 30 can implement step S124 of the above-mentioned touch drive method, for specific introduction, reference may be made to the relevant description of the above-mentioned step S124, and the specific introduction will not be repeated here.

For example, in some examples, the control unit 30 is further configured to: in the time domain, in the case where the signal rising edge or the signal falling edge of the initial scan signal ASYNC1 does not fall within the duration of the first level L1 of the display mask signal D-Mask, enable the touch scan signal ASYNC2 to be consistent with the initial scan signal ASYNC1. For example, in this example, the control unit 30 can implement step S125 of the above-mentioned touch drive method, for specific introduction, reference may be made to the relevant description of the above-mentioned step S125, and the specific introduction will not be repeated here.

It should be noted that before the control unit 30 performs the above-mentioned judgment operation, the control unit 30 may also include acquiring the above-mentioned initial scan signal ASYNC1 and the display mask signal D-Mask. For the specific acquisition method, reference may be made to the settings in this field, and will not be repeated here. For example, the control unit 30 also includes a signal acquisition circuit, and the signal acquisition circuit can acquire the initial scan signal ASYNC1 and the display mask signal D-Mask, so that the control unit 30 can determine the touch scan signal based on the initial scan signal ASYNC1 and the display mask signal D-Mask. For the specific structure and principle of the signal acquisition circuit, reference may be made to related introductions in the field, and details are not repeated here.

For example, in some examples, the display structure 71 includes pixel units P in the N rows and M columns (not illustrated in the figure). For example, the control unit 30 is configured to provide N row synchronization signals HSYNC to the display structure 71, so that the display structure 71 performs progressive scan on the pixel units P in the N rows and M columns in response to the N row synchronization signals HSYNC. For example, an n-th row synchronization signal HSYNC controls the scan of an n-th row of the pixel units P. For example, the control unit 30 provides the N row synchronization signals HSYNC to the gate drive circuit 50 of the display structure 71, for example, the gate scan signal generated by the gate drive circuit 50 is provided to the pixel units P in a corresponding row under the control of the row synchronization signal HSYNC provided by the control unit 30 to achieve the progressive scan of the pixel array in the display structure 71.

It should be noted that the touch display device 1 may also include other components, such as a signal modulation and demodulation circuit, a voltage conversion circuit, etc. These components may, for example, adopt existing conventional components, and will not be described in detail here.

At least one embodiment of the present disclosure further provides an electronic equipment, the electronic equipment includes the touch display device provided in any embodiment of the present disclosure, for example, includes the touch display device 1 in the foregoing embodiment.

Figure 6:
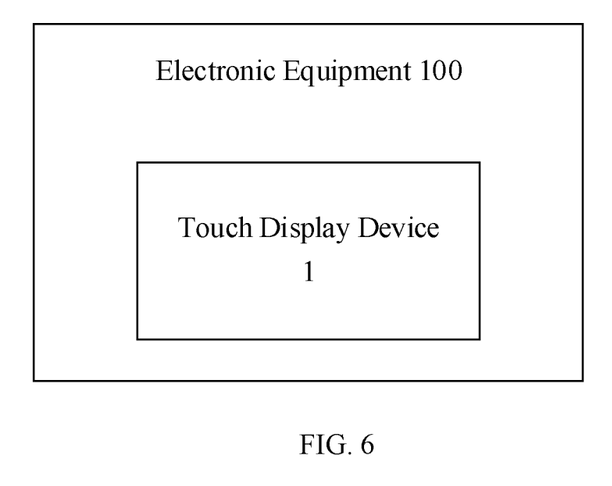
FIG. 6 is a schematic structural diagram of an electronic equipment provided by at least one embodiment of the present disclosure.

FIG. 6 is a schematic block diagram of an electronic equipment provided by at least one embodiment of the present disclosure. For example, as illustrated in FIG. 6, the electronic equipment 100 includes a touch display device 1, for example, the touch display device 1 may be the touch display device 1 illustrated in FIG. 2.

For example, the electronic equipment provided by the embodiments of the present disclosure may be any product or component with a display function and a touch function, such as a display substrate, a display panel, an electronic paper, a mobile phone, a tablet computer, a television, a monitor, a notebook computer, a digital photo frame, a navigator, etc., and the embodiments of the present disclosure are not limited to this case.

For the structure, function, and technical effects of the electronic equipment provided in the embodiments of the present disclosure, reference may be made to the corresponding descriptions in the touch display device and the touch drive method provided in the above embodiments of the present disclosure, and similar portions will not be repeated here.

The following should be noted:

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

What is claimed is:

1. A touch drive method for a touch display device, wherein the touch display device comprises a display structure and a touch structure stacked with the display structure, a touch scan frequency of the touch structure is different from a display scan frequency of the display structure, and the touch drive method comprises:
   applying a touch scan signal to the touch structure during a process in which the display structure performs progressive scan in respond to a row synchronization signal,
   generating a display mask signal based on the display noise signal,
   wherein a display noise signal is generated during at least one level switching process of the row synchronization signal; and
   each period of the touch scan signal has a signal rising edge and a signal falling edge, and the signal rising edge and the signal falling edge of each period of the touch scan signal are respectively located outside a noise duration of the display noise signal,
   wherein the display mask signal comprises a first level and a second level,
   in a time domain, the noise duration of the display noise signal overlaps with a duration of the first level of the display mask signal, and a non-noise duration of the display noise signal overlaps with a duration of the second level of the display mask signal.

2. The touch drive method according to claim 1, wherein the noise duration of the display noise signal falls within the duration of the first level of the display mask signal.

3. The touch drive method according to claim 1, wherein the signal rising edge of the touch scan signal is a stage at which the touch scan signal changes from a non-effective level to an effective level, and the signal falling edge of the touch scan signal is a stage at which the touch scan signal changes from the effective level to the non-effective level; or
   the signal rising edge of the touch scan signal is a stage at which the touch scan signal changes from the effective level to the non-effective level, and the signal falling edge of the touch scan signal is a stage at which the touch scan signal changes from the non-effective level to the effective level.

4. The touch drive method according to claim 3, further comprising:
   generating the touch scan signal, wherein the touch scan signal is maintained at the effective level in the duration of the first level of the display mask signal.

5. The touch drive method according to claim 3, further comprising:
   generating an initial scan signal;
   in the time domain, in a case where a signal falling edge of the initial scan signal falls within the duration of the first level of the display mask signal, adjusting the signal falling edge of the initial scan signal to overlap with the signal falling edge of the display mask signal to generate the touch scan signal, so that the touch scan signal is maintained at the effective level in the duration of the first level of the display mask signal; and
   in the time domain, in a case where a signal rising edge of the initial scan signal falls within the duration of the first level of the display mask signal, adjusting the signal rising edge of the initial scan signal to overlap with the signal rising edge of the display mask signal to generate the touch scan signal, so that the touch scan signal is maintained at the effective level in the duration of the first level of the display mask signal.

6. The touch drive method according to claim 5, further comprising:
   in the time domain, in a case where the signal rising edge or the signal falling edge of the initial scan signal does not fall within the duration of the first level of the display mask signal, enabling the touch scan signal to be identical to the initial scan signal.

7. The touch drive method according to claim 1, wherein in each period of the touch scan signal, the signal rising edge of the touch scan signal is before the signal falling edge of the touch scan signal, or in each period of the touch scan signal, the signal falling edge of the touch scan signal is before the signal rising edge of the touch scan signal.

8. The touch drive method according to claim 1, wherein the display structure comprises pixel units in N rows and M columns, and the display structure performs progressive scan on the pixel units in the N rows and M columns in response to N row synchronization signals;
   wherein an n-th row synchronization signal controls a scan for an n-th row of the pixel units; and
   N and M are integers greater than 1, and n is an integer greater than or equal to 1 and less than or equal to N.

9. The touch drive method according to claim 1, wherein the touch structure switches working states in respond to signal rising edges and the signal falling edges of the touch scan signal.

10. A touch display device, comprising:
    a display structure, a touch structure, and a control unit,
    wherein the display structure and the touch structure are stacked, and a touch scan frequency of the touch structure is different from a display scan frequency of the display structure,
    the control unit is configured to provide a row synchronization signal to the display structure, and apply a touch scan signal to the touch structure during a process in which the display structure performs progressive scan in respond to the row synchronization signal,
    wherein a display noise signal is generated during at least one level switching process of the row synchronization signal; and each period of the touch scan signal has a signal rising edge and a signal falling edge, and the signal rising edge and the signal falling edge of each period of the touch scan signal are respectively located outside a noise duration of the display noise signal, wherein the control unit is further configured to:

generate a display mask signal based on the display noise signal, wherein the display mask signal comprises a first level and a second level, in a time domain, the noise duration of the display noise signal overlaps with a duration of the first level of the display mask signal, and a non-noise duration of the display noise signal overlaps with a duration of the second level of the display mask signal.

11. The touch display device according to claim 10, wherein the noise duration of the display noise signal falls within the duration of the first level of the display mask signal.

12. The touch display device according to claim 10, wherein the control unit is further configured to:

generate the touch scan signal, wherein the touch scan signal is maintained at an effective level in the duration of the first level of the display mask signal.

13. The touch display device according to claim 10, wherein the control unit is further configured to:

generate an initial scan signal;

in the time domain, in a case where a signal falling edge of the initial scan signal falls within the duration of the first level of the display mask signal, adjust the signal falling edge of the initial scan signal to overlap with the signal falling edge of the display mask signal to generate the touch scan signal, so that the touch scan signal is maintained at an effective level in the duration of the first level of the display mask signal; and in the time domain, in a case where a signal rising edge of the initial scan signal falls within the duration of the first level of the display mask signal, adjust the signal rising edge of the initial scan signal to overlap with the signal rising edge of the display mask signal to generate the touch scan signal, so that the touch scan signal is maintained at an effective level in the duration of the first level of the display mask signal.

14. The touch display device according to claim 13, wherein the control unit is further configured to:

in the time domain, in a case where the signal rising edge or the signal falling edge of the initial scan signal does not fall within the duration of the first level of the display mask signal, enable the touch scan signal to be identical to the initial scan signal.

15. The touch display device according to claim 10, wherein the display structure comprises pixel units in N rows and M columns, and the control unit is further configured to provide N row synchronization signals to the display structure, so that the display structure performs progressive scan on the pixel units in the N rows and M columns in response to the N row synchronization signals;

wherein an n-th row synchronization signal controls a scan for an n-th row of the pixel units; and N and M are integers greater than 1, and n is an integer greater than or equal to 1 and less than or equal to N.

16. The touch display device according to claim 10, wherein the touch structure comprises a self-capacitive touch structure or a mutual-capacitive touch structure.

17. The touch display device according to claim 10, wherein the touch structure and the display structure form an in-cell structure or an on-cell structure.

18. An electronic equipment, comprising the touch display device according to claim 10.

* * * * *